(12) United States Patent
Guzman

(10) Patent No.: US 11,422,522 B2
(45) Date of Patent: Aug. 23, 2022

(54) INTEGRATED WEARABLE ENERGY GENERATION AND ANNUNCIATION SYSTEMS

(71) Applicant: Juan Guzman, Pembroke Pines, FL (US)

(72) Inventor: Juan Guzman, Pembroke Pines, FL (US)

( * ) Notice: Subject to any disclaimer, the term of this patent is extended or adjusted under 35 U.S.C. 154(b) by 359 days.

(21) Appl. No.: 16/822,565

(22) Filed: Mar. 18, 2020

(65) Prior Publication Data

US 2020/0326678 A1 Oct. 15, 2020

Related U.S. Application Data

(60) Provisional application No. 62/833,648, filed on Apr. 13, 2019.

(51) Int. Cl.
*H02J 7/02* (2016.01)
*F21V 33/00* (2006.01)
*A41D 1/00* (2018.01)
*G05B 19/042* (2006.01)
*H02S 99/00* (2014.01)
*H02J 7/35* (2006.01)
*G10L 15/22* (2006.01)
(Continued)

(52) U.S. Cl.
CPC ........... *G05B 19/042* (2013.01); *A41D 1/005* (2013.01); *A41D 27/085* (2013.01); *F21V 33/0008* (2013.01); *G10L 15/22* (2013.01); *G10L 15/26* (2013.01); *H02J 7/02* (2013.01); *H02J 7/35* (2013.01); *H02S 99/00* (2013.01); *F21Y 2115/10* (2016.08)

(58) Field of Classification Search
CPC ........ A41D 1/002; A41D 1/005; A41D 13/01; F21V 33/0008; H02J 2300/02; H02J 2300/022; H02J 7/02; H02J 7/35; G10L 15/26
See application file for complete search history.

(56) References Cited

U.S. PATENT DOCUMENTS 4,827,534 A 5/1989 Haugen
6,388,422 B1 5/2002 Lew
(Continued)

OTHER PUBLICATIONS https://www.youtube.com/watch?v=IX8Keu9KbH0.
https://www.youtube.com/watch?v=h1w0FsoMnHA.

*Primary Examiner* — Jason Crawford

(57) ABSTRACT

An integrated wearable energy generation and annunciation system is presented. The system includes a wearable item. The system also includes a plurality of solar panels integral with the wearable item and positionable on the wearable item. The system includes a plurality of light emitting diode (LED) panels integral with the wearable item and positionable on the wearable item. The system includes a plurality of batteries configured to receive power from the solar panels and to power LED panels and system components. The system also includes control circuitry arranged to interface the solar panels, the LED panels, system components, and the batteries. The system also includes a control platform structured to provide control functions for the system to generate power from the plurality of solar panels, to charge the batteries, to power and display data on the LED panels, and to coordinate functionality amongst system components.

20 Claims, 5 Drawing Sheets

(51) Int. Cl.
*A41D 27/08* (2006.01)
*G10L 15/26* (2006.01)
*F21Y 115/10* (2016.01)

(56) References Cited

U.S. PATENT DOCUMENTS

| | | | |
|---|---|---|---|
| 6,499,857 | B1 | 12/2002 | Lumley |
| 6,801,140 | B2 | 10/2004 | Mantyjarvi et al. |
| 6,834,395 | B2* | 12/2004 | Fuentes .................. G08B 5/004 2/69 |
| 8,701,578 | B2 | 4/2014 | Chung et al. |
| 8,919,982 | B2* | 12/2014 | Pulido, Jr. ............... A43B 3/36 362/103 |
| 9,243,797 | B2 | 1/2016 | Leung |
| 9,516,907 | B2 | 12/2016 | Guidry |
| 10,155,558 | B1* | 12/2018 | Thompson Alvey .. A41D 1/002 |
| 10,259,547 | B1* | 4/2019 | Kiel ............ B63C 9/20 |
| 10,408,988 | B2* | 9/2019 | Rosen ................. G02B 5/0226 |
| 10,539,312 | B2* | 1/2020 | Bernstein ............ F21V 23/0407 |
| 2004/0156215 | A1* | 8/2004 | Wooldridge ........... A41D 13/01 362/570 |
| 2004/0187184 | A1* | 9/2004 | Rubin ...................... G09G 3/20 2/69 |
| 2006/0291193 | A1* | 12/2006 | Hill ......................... B60Q 1/50 362/108 |
| 2007/0151593 | A1 | 7/2007 | Jaynes |
| 2008/0109941 | A1* | 5/2008 | Moreshead .......... D06N 3/0002 2/243.1 |
| 2009/0144887 | A1* | 6/2009 | Orandi ................... A41D 1/002 2/93 |
| 2010/0124049 | A1* | 5/2010 | Fabian ................. B60Q 1/2673 362/108 |
| 2010/0253501 | A1* | 10/2010 | Gibson .................. A41D 13/01 340/475 |
| 2013/0033852 | A1 | 2/2013 | Liao |
| 2013/0077289 | A1* | 3/2013 | Gridley .............. F21V 33/0008 362/103 |
| 2013/0104425 | A1 | 5/2013 | Kalra-Lall |
| 2013/0215604 | A1* | 8/2013 | Chu ...................... A41D 13/01 362/184 |
| 2014/0053315 | A1* | 2/2014 | Pond ...................... G09F 27/00 2/144 |
| 2014/0146525 | A1 | 5/2014 | Lueptow |
| 2014/0254143 | A1* | 9/2014 | Wansor ............... F21V 33/0008 362/103 |
| 2014/0354153 | A1* | 12/2014 | Pulido, Jr. ............... B60Q 3/80 315/307 |
| 2016/0018846 | A1* | 1/2016 | Zenoff .................... G09G 3/002 345/204 |
| 2016/0037883 | A1 | 2/2016 | Keeler et al. |
| 2016/0058076 | A1* | 3/2016 | Reho .................... A61B 5/4561 600/595 |
| 2016/0148558 | A1* | 5/2016 | Ernst ..................... G06F 1/1694 345/520 |
| 2016/0353813 | A1* | 12/2016 | Rae ....................... A41D 13/01 |
| 2017/0042260 | A1* | 2/2017 | Samuelsen ............. A41D 13/01 |
| 2017/0167720 | A1* | 6/2017 | Mueller ............... F21V 23/0464 |
| 2017/0257934 | A1* | 9/2017 | Garvey ................... G08G 1/162 |
| 2017/0262884 | A1* | 9/2017 | Miller .................... A41D 1/002 |
| 2017/0363279 | A1* | 12/2017 | Macias ..................... F21L 4/00 |
| 2018/0137749 | A1* | 5/2018 | Varga ................... G08G 1/0955 |
| 2018/0153033 | A1* | 5/2018 | Sugita .................. D03D 1/0082 |
| 2018/0153231 | A1* | 6/2018 | Ku ......................... A41D 13/01 |
| 2018/0373293 | A1* | 12/2018 | Staton ..................... G09F 9/301 |
| 2019/0037934 | A1* | 2/2019 | Swank ................... G08B 5/004 |
| 2019/0101687 | A1* | 4/2019 | Rosen ................. F21V 23/0457 |
| 2019/0109349 | A1* | 4/2019 | Thiel .................... H01M 10/465 |
| 2019/0132948 | A1* | 5/2019 | Longinotti-Buitoni ..................... D06P 1/5285 |
| 2019/0246733 | A1* | 8/2019 | Tseng ....................... A43B 3/50 |
| 2019/0315268 | A1* | 10/2019 | Garvey ............. H04M 1/72412 |
| 2019/0327832 | A1* | 10/2019 | Holbery ................. H05K 3/284 |
| 2020/0326678 | A1* | 10/2020 | Guzman .................... H02J 7/35 |
| 2021/0153574 | A1* | 5/2021 | Greszler .................. G08B 5/36 |

\* cited by examiner

INTEGRATED WEARABLE ENERGY GENERATION AND ANNUNCIATION SYSTEMS

CROSS-REFERENCE TO RELATED APPLICATIONS

This application claims priority to provisional application 62/833,648 filed on Apr. 13, 2019, and is incorporated herein by reference in its entirety.

FIELD OF THE INVENTION

The present invention relates generally to wearable energy generation systems, and more particularly, to integrated wearable energy generation and annunciation systems to allow system users to generate energy to power displays on wearable items and allow system users to interact with communications platforms to transmit data, graphics, text information, and/or animations to the displays on the wearable items.

BACKGROUND OF THE INVENTION

Many methods and systems have been used attempting unsuccessfully to improve the communications methods to convey information onto a wearable item. These systems and methods have not been reliable and they have been ineffective.

As the world's interactive communications community continues to grow, the need to provide people the ability to communicate with each other has increased. The growth of internet access has created a need for people to be able to collaborate in ways other than in person, or face to face.

Previous unsuccessful and unreliable systems and methods used by people to share and display their information with others were unreliable, costly, and time consuming.

Previous unsuccessful and unreliable systems and methods used, only allowed users to display information in a static non-dynamic fashion and limited the ability to communicate information on platforms such as wearable items.

Accordingly, there is an established need for an integrated wearable energy generation and annunciation system which solves at least one of the aforementioned problems. Further, there is an established need for an integrated wearable energy generation and annunciation system which can reduce operating costs, is reliable, is effective, and provides streamlined methods and systems to allow system users to arrange, compose, and display information onto a wearable item in a real-time fashion.

SUMMARY OF THE INVENTION

The present invention is directed to convenient, cost effective, and labor-saving integrated wearable energy generation and annunciation system which allows system users to generate energy and power displays and to allow system users to automatically and/or manually compose and arrange information, data, graphics, text, and/or animations to be displayed on a wearable item.

An integrated wearable energy generation and annunciation system suitable to generate energy to power displays on wearable items is presented. The system includes a wearable item. The system also includes a plurality of solar panels integral with the wearable item and positionable on the wearable item. Further, the system includes a plurality of light emitting diode (LED) panels integral with the wearable item and positionable on the wearable item. Additionally, the system includes a plurality of batteries configured to receive power from the solar panels and to power LED panels and system components. The system also includes control circuitry arranged to interface the plurality of solar panels, the plurality of LED panels, system components, and the plurality of batteries. Further still, the system also includes a control platform structured to provide control functions for the system to generate power from the plurality of solar panels, to charge the plurality of batteries, to power and display data on the plurality of LED panels, utilize the control circuitry, and to coordinate functionality amongst system components.

In an implementation of the invention, an integrated wearable energy generation and annunciation system can include solar panels, batteries, external charging devices, internal charging devices, wearable items, display screens, mobile application, communications platforms, and integral energy distribution systems to allow system users to generate energy to power displays and to allow system users to arrange, compose, and send digital data to be displayed on the wearable items.

In an embodiment of the present invention, the system can include solar panels integrated into wearable items. The system can also include screens and/or light emitting diode (LED) panels embedded into the wearable items. The screens can be configured to display digital information. The system can further include an energy transmission network, the network configured to power batteries and/or the flexible screens. Further, the batteries can be configured to power devices such as, but not limited to, cell phones, mobile devices, and/or handheld devices. Additionally, the system can include a communications architecture, the architecture configured to include wireless and/or hard-wired data communications capabilities. The system can also include mobile apps, the apps configured to modify digital information displayed on the screens.

In embodiments of the present invention, integrated energy generation and annunciation systems can include flexible, pliable, and/or machine washable solar panels integrated onto wearable devices. The devices can include smart shirts and/or smart wearable items.

In aspects of the present invention, the system can include flexible, pliable, and/or machine washable screens, the screens configured to display digital information.

In another aspect, the system can also include a plurality of sizes of flexible and/or pliable screens and/or a plurality of sizes of flexible and/or pliable solar panels.

In yet another aspect, the system can include encapsulated circuitry, the circuitry configured to provide system protection against environmental conditions.

In an aspect, the system can include styled-in mini solar panel strips. The strips configured to provide the system to be self-powered and/or to provide power to auxiliary components such as, but not limited to, USB drives, cell phones, mobile devices, personal area network (PAN) devices, annunciation devices, and/or other mobile devices.

In another aspect, the system can include screens, the screens further including Light Emitting Diode (LED) displays.

In yet another aspect, the system can include flexible display screens, the screens can include plasma, and/or flexible organic light emitting diodes (OLED).

In an aspect, the system can include wireless and/or hard-wired communications interfaces, the interfaces configured to provide data exchange capability amongst a plurality of devices.

In another aspect, the system can also include a library of designs.

In yet another aspect, the system can include display screens on a front, back, top, and/or a surface of a wearable item.

In an aspect, the system can include hardened components, the components configured to allow the system to be machine washable and to function in severe weather conditions.

In another aspect, the system can include data communications networks configured to provide capability of modifying digital information displayed on screens. The networks can include, but are not limited to, mobile devices, smart phones, tablets, apps, desktop computers, laptops, servers, wireless systems, and/or hard-wired systems.

In yet another aspect, the system can include real-time capability to display messages, the messages originating from a plurality of external and/or internal devices. The external devices can include, but are not limited to mobile devices, smart phones, tablets, apps, desktop computers, laptops, servers, wireless systems, and/or hard-wired systems. The internal devices can include, but not limited to, internal sensors, the sensors configured to monitor and display physical characteristics of a wearer of the system. The physical characteristics can include, but are not limited to heart rate, oxygen percentage in the blood, alcohol level in blood, pulmonary function, electrocardiogram (ECG), and/or other vital signs.

In an aspect, the system can include communications architecture, the architecture configured to allow real-time communication amongst a plurality of other integrated wearable energy generation and annunciation systems.

In another aspect, the system can also include screens and/or solar panels sewn into wearable devices, and/or attached in an integral fashion. In aspects of the present invention, the system can include a plurality of LED panels. The panels can include panels positionable on wearable items, the panels configured to display data. Further, the panels can also substantially cover an entire surface area of the wearable items. Also, the panels can be configured to display data and/or information aligned vertically, horizontally, and/or at an oblique angle to the wearable item.

In another aspect, the system can include wearable items such as but not limited to shirts, pants, outer wear, underwear, hats, and/or gloves. The wearable items configured such that aggregate messaging and/or data transmission can be shared amongst the wearable items.

In yet another aspect, the system can include a plurality of solar panels. The solar panels positionable on a wearable item and configured on the wearable item to generate power. The solar panels can include shapes such as but not limited to squares, triangle, hexagonal patterns, circles, ovals, rectangles, trapezoids, octagons, and/or strips. The panels can also include sizes extending beyond a surface area of a wearable item and/or covering a substantial area of the wearable item. The panels also include sizes covering, but not limited to, about 100%, 90%, 80% 75%, 50%, 25%, 15%, 10%, 5% and/or 1% of the surface area of a wearable item and any percentage in between. The shapes and sizes are chosen for specific wearable item applications to optimize energy generation for the operating environment.

In embodiments, the system can include a plurality of LED displays. The displays positionable on a wearable item and configured on the wearable item to display digital data. The displays can include shapes such as but not limited to squares, triangle, hexagonal patterns, circles, ovals, rectangles, trapezoids, octagons, and/or strips. The displays can also include sizes extending beyond a surface area of a wearable item and/or covering a substantial area of the wearable item. The displays can also include sizes covering, but not limited to, about 100%, 90%, 80%, 75%, 50%, 25%, 15%, 10%, 5% and/or 1% of the surface area of a wearable item and any percentage in between. The shapes and sizes are chosen for specific wearable item applications to optimize display illumination and display range for the operating environment.

In an aspect of the present invention, the system can include mobile applications. The mobile applications can be configured to communicate with LED panels on a wearable item. The mobile applications can function on platforms such as but not limited to mobile devices, smart phones, tablets, desktop computers, smart watches, cell phones, laptops, servers, and/or computing devices. The mobile applications can be configured to allow users to communicate to a plurality of displays on a plurality of wearable items and/or to display data, messages, graphics, video clips, movies, and/or other information on the displays of the plurality of wearable items.

The mobile applications can include algorithms, rules, source code, and/or components configured to allow users to utilize the mobile applications to display information on LED displays.

In an aspect, the system can include mobile applications, the applications configured to allow a user to type text, free-hand draw images, upload images, upload animations, and/or graphics of a plurality of shapes and/or colors to be displayed on LED displays on a plurality of wearable items. In another aspect, the system can include a plurality of solar panels, the solar panels including perovskite solar panels.

In yet another aspect, the system can include batteries, the batteries including three-dimensional solid-state (3DSS) architectures for thin-film batteries for portable and wearable devices.

In an aspect, the system can include stretchable electronics, the electronics positionable on and/or within wearable items, wherein the electronics can be configured to physically distort and maintain functionality.

In another aspect, the system can include flexible solar panels, the panels positionable on and/or embedded into wearable items. Further, the system can include LED panels. Also, the system can include energy storage components, the components configured to provide a power source for the LED panels. Additionally, the energy storage components can be configured to provide the power source to the LED panels during time frames when an external light source and/or sunlight is not available.

In yet another aspect, the system can include photovoltaic textile technology, the technology including polymer fibers. The fibers can include, but are not limited to, zinc oxide, the zinc oxide can be configured to be woven together with copper wire. Further, the fibers can be embedded with a plurality of solar cells with a plurality of sizes. The solar cells configured to capture ambient light.

In an aspect, the system can also include copper-coated polytetrafluoroethylene strips, the strips configured with copper wire such that mechanical and/or electric energy is generated from friction.

In another aspect, the system can also include solar fabric battery storage, the battery storage including polyester yarn coated with nickel and/or carbon and/or polyurethane configured to produce a functional flexible battery when repeatedly bent and/or folded.

In yet another aspect, the system can include LED panels which can come in a variety of sizes, and in a plurality of shapes and dimensions. The shape, size, and dimension are determined by where on the wearable item they will be placed and the desired distance from the wearable item from where the text, information, graphics and/or animation can be observed. For example, if the panels are going to be on an area where twisting and bending may occur, smaller sized panels may be chosen to mitigate deformation of the panels. The panels could be as large as to cover the whole front of back of a shirt or jacket and as small as to cover just the sleeve of a t-shirt or a cap. The size, dimension, shape and LED power output can be configurable to output a plurality of display lumens. The system can be arranged to provide adequate display output to allow proper communication in specific weather conditions, such as but not limited to rain, fog, smoke, and/or night time use. For example, if the system were being used for safety purposes, the minimum required display output would be designed to meet the safety requirements for specific situations.

In an embodiment, the solar panels can be fashionable and designed with social appeal factors considered. The system can include a plurality of layouts of solar panels in a way that makes the wearable more stylish, by using strips of solar panels or a mosaic design distributing the solar panels, etc. The aesthetic appeal of the placement of the solar panels includes positioning of the solar panels to optimize energy generation as well as social acceptance criteria. Factors such has local culture, language, religious preferences, and age group of users are taken into consideration.

In another embodiment the system can also include a mobile app which can include a plurality of options. The system can include the possibility of uploading any type of image and being able to display a plurality of images.

In yet another embodiment, the system can include components such as but not limited to mobile apps, hardened circuitry, hermetically sealed circuitry and connection points, flexible LED panels, flexible solar panels, charging connections for charging external components, a plurality of wearable items, wearable items, such as hats, gloves, shirts, jackets, shorts, pants, umbrellas, school books, backpacks. The system can also include digital clothing, configured to visually annunciate verbal communication with a voice recognition system.

In an aspect, the system can include a plurality of control platforms to provide users programmable routines to customize graphics, texts, videos, and/or animations on wearable items.

In another aspect, the system can also include wearable items which can include LED panels, integral solar panels and/or solar panel strips, the panels can be integral with methods such as but not limited to sewing, embedding, fusing, gluing, and/or fasteners to connect the panels with the wearable items. The system can include solar panels which can power control and display functions of the system.

In yet another aspect, the app can also be able to allow the user to type text to be displayed, as well as free hand drawing and also be able to display uploaded images or animations, not limited by any type of shape or color.

In an embodiment, the solar panels can be flexible and embedded into the fabric as well as the LED panels, and can also incorporate power storage with batteries, so that the wearable item doesn't lose power if not exposed to the sun.

In another embodiment, the system can also include photovoltaic textile technology which can combine two different polymer fibers, both of which are lightweight and low-cost. One component can be a fiber coated with several chemical elements and compounds. Among them is zinc oxide, a photovoltaic material, which can be woven together with copper wire. Essentially, this embeds the fiber with tiny solar cells that can capture ambient light. A second component can be made of copper-coated polytetrafluoroethylene strips along with more copper wire, materials that generate mechanical energy or electricity from friction. As for solar fabric battery storage, the system can include polyester yarn coated with nickel and carbon combined with polyurethane which can produce a flexible battery that continues to work even when repeatedly bent and folded.

In yet another embodiment, the solar panels can be connected to an internal and/or external battery system.

In an aspect, the system can include internal and/or external control platforms allowing a wearable item user and/or an external entity to control the system with respect to power generation, battery charging evolutions, external component charging, and/or LED display data. The platforms can include but are not limited to mobile applications, desktops, laptops, mobile devices, tablets, smart phones, smart watches, and/or cell phones.

In another aspect, the system can also include hermetically sealed, pliable, flexible, high and low temperature resistant (system can be operable about 20-130 degrees Fahrenheit), water resistant, circuitry, control platforms, charging interfaces, LED panels and/or solar panels. The system can include these panels and/or components to be integral to wearable items such that the system can be machine washable. Further, the system can include graphene-coated fabric (GCF) components designed to be water resistant.

In yet another aspect, the system can include a plurality of wearable items such as but not limited to shoes, socks, shorts, shirts, hats, gloves, jackets, jerseys, umbrellas, backpacks, burkas, scarfs, and/or shawls. The system can include interconnectivity amongst a plurality of wearable items simultaneously.

In an embodiment, the system can include solar panel strips which are sized and positioned on wearable items to self-power LED displays, control platforms, control circuitry, recharge batteries, and/or charge external components with charging connections, the connections being wired, wireless and/or inductive charging interfaces.

In another embodiment, the system can also include solar panels and/or LED panels sized and positionable on wearable items to enhance a wearers mobility and comfort. For example, the system can include panels that would allow unimpeded arm and/or leg motion.

In yet another embodiment, the system can include solar panels and LED panels which can be arranged on sections of wearable items which experience minimal flexing, twisting, and/or deforming.

In an aspect, the system can include solar panels and LED panels sized, shaped, and/or positioned in areas where bending may occur with smaller panels arranged such that deformation of the panels is minimized.

In another aspect, the system can also include military grade battle field condition hardened control platforms, control circuitry, charging interfaces, solar panels, batteries and/or LED panels to allow the system to function under extreme environmental conditions. The military grade battle field conditions as defined by the United States Department of Defense.

In yet another aspect, the system can include databases of graphics, videos, text messages, and/or animations to be displayed.

In an embodiment, the system can include solar panels and LED panels positionable on any surface area of wearable items.

In another embodiment, the system can also be configured to be water resistant up to two atmospheres pressure. The system can include deployment onto surfaces of scuba diving equipment, scuba diving gear, and wet suits to allow users to communicate underwater with the system displays. The system can be structured to allow data communication to occur in line of sight displays to provide a communications medium between people under water.

In yet another embodiment, the system can be arranged to allow the system to display data on exterior surfaces of cars, trucks, boats, planes, snow mobiles, and other moving vehicles. The system can be structured to allow data communication to occur in line of sight displays to provide a communications medium between vehicles.

In an aspect, the system can include stretchable thin-film transistor (TFT) driven LED displays laminated into textiles.

In another aspect, the system can also include LED displays which can be fabricated on a polyimide substrate and encapsulated in rubber, allowing the displays to be laminated into textiles that can be washed.

In yet another aspect, the system can include wireless communication capability configured to interact with social media platforms, such as but not limited to Instagram, twitter, Facebook, dating sites, and/or business accounts structured to provide near real-time interaction.

In an embodiment, the system can include cameras, the cameras configured to transmit videos and pictures.

In another embodiment, the system can also include micro inverters, micro batteries, micro solar panels, micro data processors, micro LED panels, micro charge controllers, and micro control circuitry.

In yet another embodiment, the system can include hand held remote controllers configured to control the system.

In an aspect, system components can be placed on an inside of a wearable item and/or accessed via pouches, pockets, and/or sealable enclosures. Further, system control circuitry can be hemmed into the wearable item.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an effective, efficient, convenient, and economical integrated wearable energy generation and annunciation system which can be used for personal use and for commercial purposes.

Figure 1:
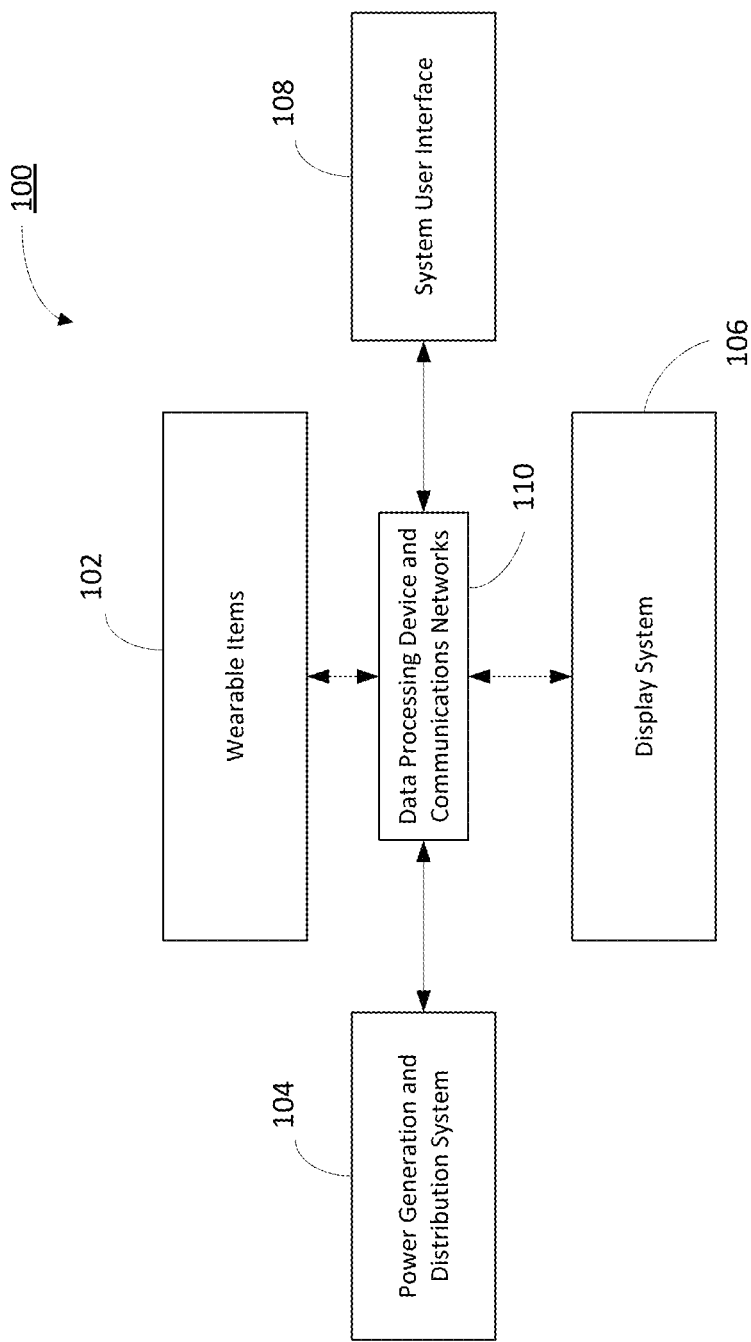
FIG. 1 presents a functional block diagram in accordance with an embodiment of the present invention.

Initially turning to FIG. 1, a functional block diagram of an embodiment of an integrated wearable energy generation and annunciation system 100 is presented. The system 100 can include a wearable item 102. The system 100 can also include a power generation and distribution system 104. The system 100 can further include a display system 106. The system can additionally include a system user interface 108. The components of the system 100 interface with a data processing device and communications networks 110 in order to carry out control and operational actions.

Figure 3:
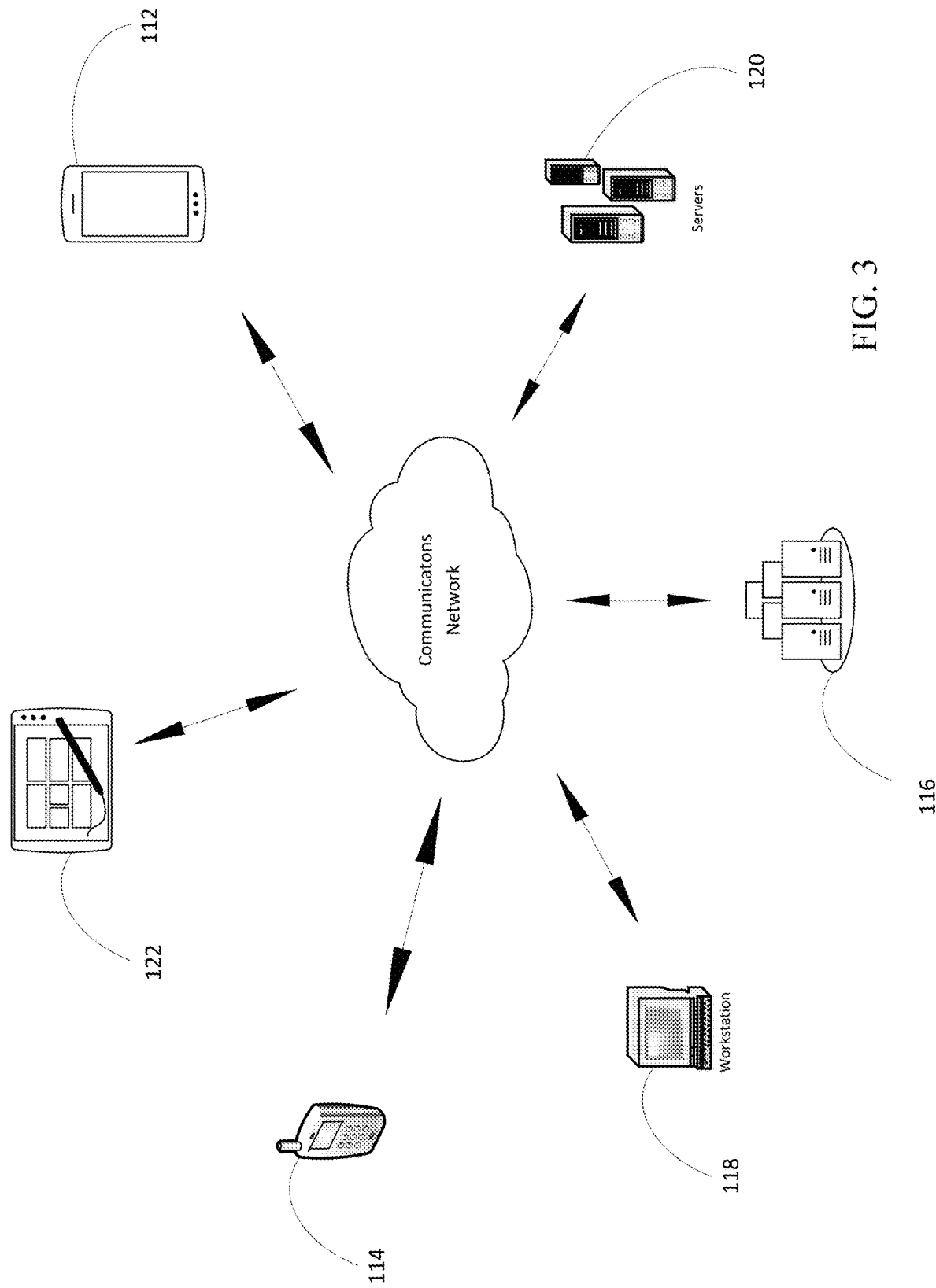
FIG. 3 presents an embodiment of the present invention displaying various embodiments on various platforms connected on a communications network.

Referring to FIGS. 1 and 3, an exemplary embodiment of the present invention is presented. Users of the system 100 can utilize a plurality of communications devices contained in the system on commonly used platforms. Platforms utilized can be smart phones 112, cell phones 114, mobile devices 116, workstations 118, servers 120, tablets 122, and/or any device which provides communication capacity to the system in order for users of the system to arrange, control, and/or communicate with system 100 components such as system display, solar panels, and/or system controls. The system can utilize algorithms which allow real-time communication amongst users of the system.

Figure 2:
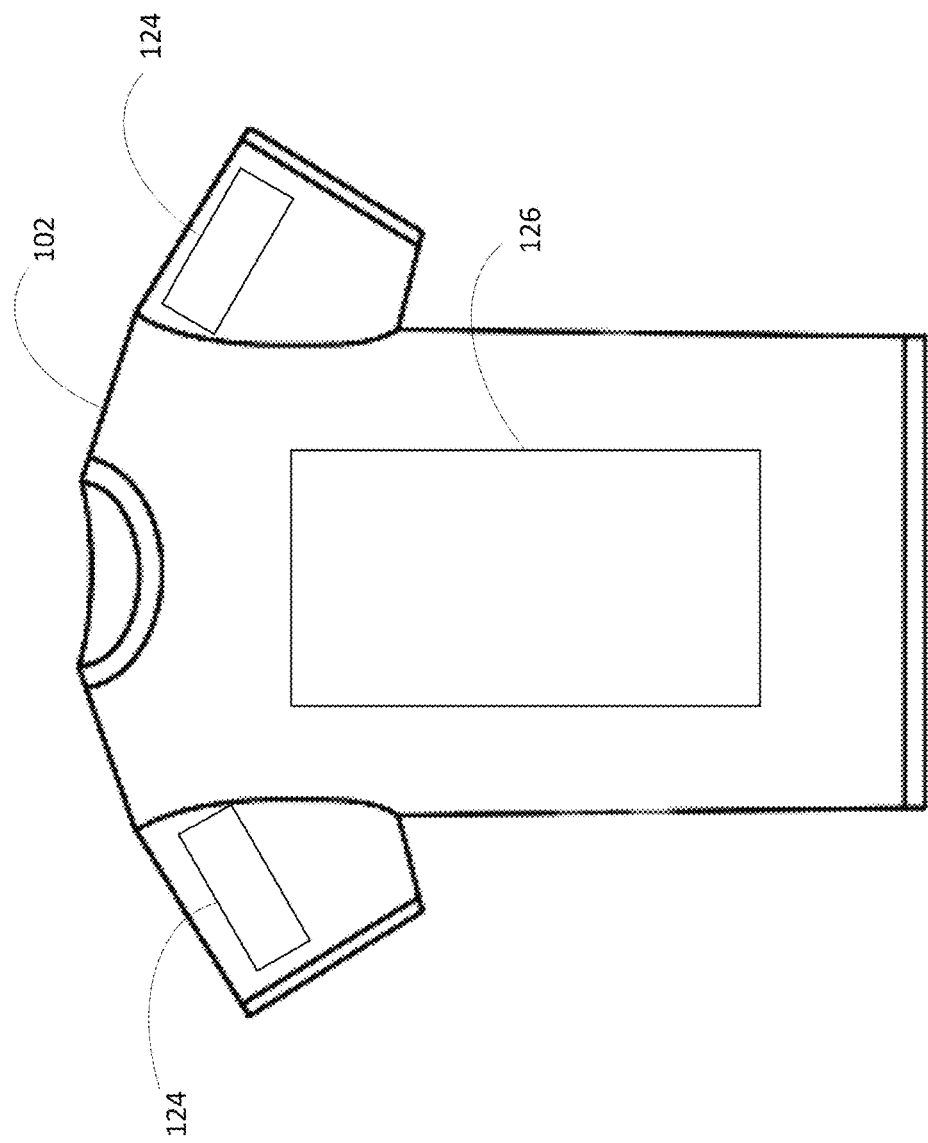
FIG. 2 presents an embodiment of the present invention displaying a wearable item with a display screen and solar panels.
Figure 4:
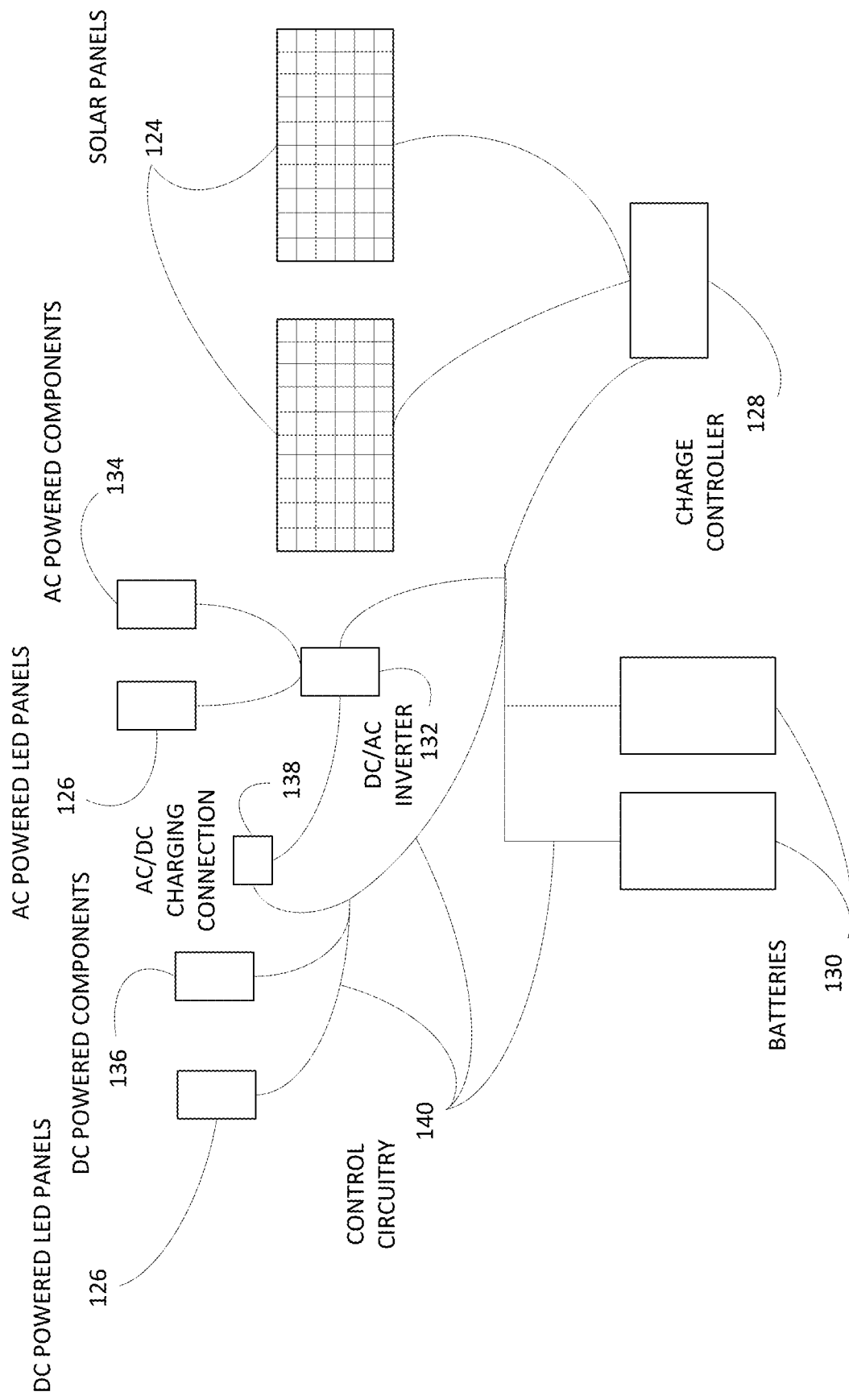
FIG. 4 presents an embodiment of the present invention illustrating a functional schematic of the system.
Figure 5:
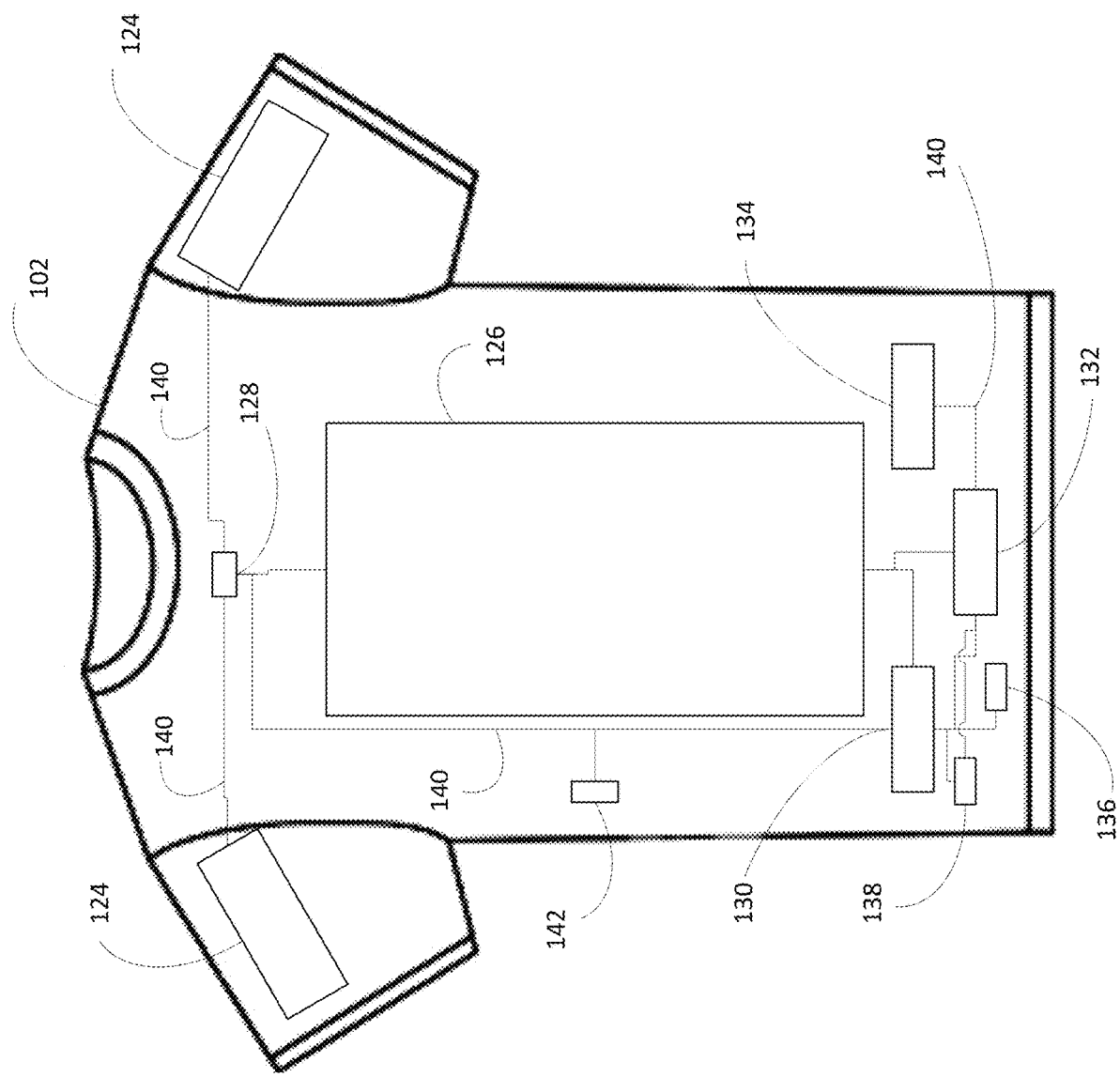
FIG. 5 presents an embodiment of the present invention showing interconnectivity of system components on a wearable item.

Turning to FIG. 2, an embodiment of the system 100 is shown. displaying a wearable item 102 with a display 126 and solar panels 124. The system 100 can include solar panels 124 which can be integrated into the wearable item 102. The solar panels 124 can be configured to generate energy to power LED displays 126 and/or power a battery device 130, as seen in FIGS. 4 and 5. The LED displays 126 can also be integrated into the wearable item 102. The battery device 130 can be configured to provide power directly to the LED displays 126. Further, the LED screens 126 can be connected to a data processor and communications network 110 module. The control module can be configured to receive data, digitally and/or analog, from internal sensors and/or external sensors. Additionally, the system 100 can include communication devices, the communication devices can be configured to receive data externally and/or internally. The communication devices can also be configured to receive data through hard-wired communications platforms and/or wireless communication platforms. The communications devices can be configured to deliver data to the display screens 126. Further still, the system 100 can include mobile applications. The mobile applications configured to control data and/or information to be displayed on the LED displays 126. The system 100 can also be configured to display data, information, graphics, and/or animations on the LED displays 126.

The system 100 can also include wires embedded into the wearable item. The wires configured to transmit energy and/or data to and/or from solar panels 124, display screens 126, internal battery device 130, external battery device, and/or external chargeable devices.

As best seen in FIG. 4, system 100 components are schematically shown to display interconnectivity of the system. The system includes solar panels 124. A plurality of panels 124 can be used to produce more electricity than is consumed and then any excess energy that is produced is stored in the batteries 130 for nighttime and cloudy/rainy weather use. The panels 124 may be available in different sizes, voltages, and amperages. They can be wired in series, in parallel, or both. The system 100 can also include a charge controller 128. The charge controller 128 can monitor the electricity produced by the solar panels and then regulate the electricity to charge the batteries 130 and prevent them from becoming overcharged. Proper charging may be critical to prevent any damage to the batteries 130. The system 100 can include one or a plurality of batteries 130. A plurality of batteries 130 can be used to store the excess electrical power from the solar panels 124 for later use. Without the batteries, you may only have power when the sun was shining or external light source was present to provide power input. The system can further include a DC/AC inverter 132. The inverter 132 can convert the DC volts produced by the solar panels 124 (or from the energy stored in the batteries 130) into AC volts to power AC LED panels and/or AC powered components 134. The system can also power DC powered components 136. Further still, the system 100 can include charging connections 138. The charging connections configured to supply A/C and/or D/C power to charge components, 134 and 138 respectively, which are external to the system 100.

Referencing FIG. 5, a functional schematic showing the system 100 components embedded in a wearable item 102 is shown. The system 100 includes solar panels 124 and displays 126 on an exterior of a wearable item 102. The solar panels 124 and displays 126 can be integral to the wearable item 102 and positionable on an exterior of the wearable item 102. The system 100 can also include embodiments wherein the solar panels 126 can be directly powered by the solar panels 124. The system 100 can include control circuitry 140, the control circuitry 138 designed to provide control and operational command functions amongst the system 100 components and interactively engage with a data processor and control platform 142. In embodiments not shown, the system 100 components can be embedded within an interior of the wearable item 102 wherein the system 100 components can be accessed within a pocket and/or a holding compartment within the wearable item 100.

In embodiments not shown, the system can be enhanced with application of system algorithms and/or combining functionalities of any of the elements of the modules of the system and/or any elements and/or features disclosed herein.

In embodiments not shown the platforms can include, but not limited to, applications, user interfaces, graphical user interfaces, speech recognition applications, video teleconferencing applications, and/or mobile device communication applications.

In other embodiments, not shown, the integrated wearable energy generation and annunciation system can be deployed to interact with a data processor or a plurality of data processors to facilitate choosing and/or collaborating amongst users of the system.

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An integrated wearable energy generation and annunciation system suitable to generate energy to power displays on wearable items comprising:
A wearable item;
a plurality of solar panels integral with the wearable item and positionable on the wearable item;
a plurality of light emitting diode (LED) panels integral with the wearable item and positionable on the wearable item, wherein the plurality of LED panels include AC powered LED panels and DC powered LED panels;
a DC/AC inverter;
charging connections positionable within the system and configured to charge AC and DC external components;
a plurality of batteries configured to receive power from the solar panels and to power LED panels and system components;
control circuitry arranged to interface the plurality of solar panels, the plurality of LED panels, system components, and the plurality of batteries; and
a control platform structured to provide control functions for the system to generate power from the plurality of solar panels, to charge the plurality of batteries, to power and display data on the plurality of LED panels, utilize the control circuitry and to coordinate functionality amongst system components.

2. The system of claim 1 further comprising a mobile application.

3. The system of claim 1 further comprising a data processor.

4. The system of claim 1 further comprising micro components formed with in-mold electronics (IME) technology.

5. The system of claim 1 further comprising perovskite solar panels.

6. The system of claim 1 further comprising blue tooth low energy (BTLE) system components.

7. The system of claim 1 further comprising a plurality of fibers coated with zinc oxide.

8. The system of claim 1 further comprising stretchable thin-film transistor (TFT) driven LED displays laminated into textiles.

9. The system of claim 1, wherein the plurality of LED panels includes displays which can be fabricated on a polyimide substrate and encapsulated in rubber.

10. The system of claim 1, wherein the plurality of batteries includes three dimensional solid-state (3DSS) architectures for thin-film batteries.

11. The system of claim 1 further comprising photovoltaic textile technology strips.

12. The system of claim 1 further comprising copper-coated polytetrafluoroethylene strips, the strips configured with copper wire such that mechanical and/or electric energy is generated from friction.

13. The system of claim 1 further comprising a solar fabric battery storage unit, the solar fabric battery storage unit includes polyester yarn coated with nickel and/or carbon and/or polyurethane configured to produce a functional flexible battery when repeatedly bent and/or folded.

14. The system of claim 1, further comprising an annunciation interface configured to visually annunciate spoken words with a voice recognition system.

15. The system of claim 1, further comprising hermetically sealed, pliable, flexible, high and low temperature resistant and water-resistant circuitry, control platforms, charging interfaces, LED panels and/or solar panels.

16. The system of claim 1, further comprising wireless and wired charging connections, the charging connections configured to include wired and wireless charging interfaces arranged to charge external components.

17. The system of claim 1 further comprising military grade battle field condition hardened control platforms, control circuitry, charging interfaces, solar panels, batteries and/or LED panels to allow the system to function under extreme environmental conditions.

18. The system of claim 1 further comprising display surfaces positionable on scuba diving equipment, scuba diving gear, and wet suits to allow users to communicate underwater with the system displays, the system can be structured to allow data communication to occur in line of sight displays to provide a communications medium between people under water.

19. The system of claim 1 further comprising display surfaces positionable on exterior surfaces of cars, trucks, boats, planes, snow mobiles, and/or other moving vehicles, the system can be structured to allow data communication to occur in line of sight displays to provide a communications medium between vehicles.

20. The system of claim 1 wherein the data transmission amongst control platforms, control circuitry, the plurality of LED panels, the plurality of solar panels, and the plurality of batteries utilizes wireless transmission.

* * * * *